(12) United States Patent
Nagata et al.

(10) Patent No.: US 8,108,630 B2
(45) Date of Patent: Jan. 31, 2012

(54) STORAGE APPARATUS, AND STORAGE CONTROL METHOD USING THE SAME

(75) Inventors: Koji Nagata, Kaisei (JP); Masaaki Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 608 days.

(21) Appl. No.: 12/003,905

(22) Filed: Jan. 3, 2008

(65) Prior Publication Data

US 2008/0168240 A1 Jul. 10, 2008

(30) Foreign Application Priority Data

Jan. 5, 2007 (JP) ................. 2007-000746

(51) Int. Cl.
*G06F 12/00* (2006.01)
*G06F 13/00* (2006.01)
*G06F 13/28* (2006.01)

(52) U.S. Cl. ................. 711/154; 711/112; 711/E12.001

(58) Field of Classification Search .................. 711/112, 711/154, E12.001

See application file for complete search history.

(56) References Cited

U.S. PATENT DOCUMENTS

| 6,691,245 | B1 * | 2/2004 | DeKoning | 714/6 |
| 7,353,335 | B2 * | 4/2008 | Kawamura | 711/114 |
| 2006/0020640 | A1 | 1/2006 | Suzuki et al. | |
| 2006/0085575 | A1 * | 4/2006 | Hosouchi et al. | 710/38 |
| 2006/0218210 | A1 * | 9/2006 | Sarma et al. | 707/204 |
| 2007/0185924 | A1 * | 8/2007 | Kawamura | 707/202 |

FOREIGN PATENT DOCUMENTS

JP 2006-031579 7/2004

* cited by examiner

*Primary Examiner* — Sheng-Jen Tsai (74) *Attorney, Agent, or Firm* — Foley & Lardner LLP (57) ABSTRACT

The present invention aims at providing a storage apparatus that does not increase the I/O load on a primary volume, even if there are several secondary volumes for which data consistency with the primary volume should be guaranteed. A storage apparatus writes write data for write access directed to a primary volume P to a secondary volume S1. A controller in the storage apparatus copies that write data from the secondary volume S1 to secondary volumes. S2 and S3 in background processing. The storage apparatus uses bitmaps to manage data in the secondary volume S1 shared by each of the secondary volumes S2 and S3.

16 Claims, 7 Drawing Sheets

<VOLUME MANAGEMENT TABLE>

| PAIR # | PRIMARY VOLUME # | SECONDARY VOLUME # | PAIR CONTROL STATUS | GROUP # |
|---|---|---|---|---|
| 1 | 1 | 1 | "SPLIT" | 1 |
| 2 | 1 | 2 | "SYNCHRONOUS-PAIR" | 1 |
| 3 | 1 | 3 | "ASYNCHRONOUS-PAIR" | 1 |
| ⋮ | ⋮ | ⋮ | ⋮ | ⋮ |
| n | 1 | n | "TRANSITION" | 1 |

<VOLUME MANAGEMENT TABLE>

| PAIR # | PRIMARY VOLUME # | SECONDARY VOLUME # | PAIR CONTROL STATUS | GROUP # |
|---|---|---|---|---|
| 1 | 1 | 1 | "SPLIT" | 1 |
| 2 | 1 | 2 | "SYNCHRONOUS-PAIR" | 1 |
| 3 | 1 | 3 | "ASYNCHRONOUS-PAIR" | 1 |
| ⋮ | ⋮ | ⋮ | ⋮ | ⋮ |
| n | 1 | n | "TRANSITION" | 1 |

STORAGE APPARATUS, AND STORAGE CONTROL METHOD USING THE SAME

CROSS-REFERENCES TO RELATED APPLICATIONS

This application relates to and claims priority from Japanese Patent Application No. 2007-000746, filed on Jan. 5, 2007, the entire disclosure of which is incorporated herein by reference.

BACKGROUND

1. Field of the Invention

The present invention relates to a storage apparatus that provides a host apparatus with relevant controls for the host apparatus to store data in a storage unit. More specifically, the invention relates to a storage apparatus with a control function used when writing write data sent from a host apparatus to secondary volume(s).

2. Description of Related Art

A storage apparatus is an apparatus that is connected to host computer(s) and constitutes a storage control system, providing the host computer(s) with large-capacity storage areas. In that type of storage apparatus, a plurality of storage devices (e.g. hard disk drives) is installed in its case in arrays. The storage apparatus virtualizes its storage resources and provides them to the host computer(s). The host computer(s) recognize logical volumes, which are made by virtualizing physical storage areas, and write/read-access those logical volumes. In the above, the storage apparatus defines a RAID group composed of several storage devices to ensure data redundancy. The host computer(s) may directly be connected to the storage apparatus, or they may also be connected via a SAN or an IP communication network. Note that a storage apparatus like the above is also referred to as a storage subsystem or a storage controller.

An application program running on a host computer read/write-accesses volumes, and writes/reads the relevant data to/from a storage unit, which is a physical resource. A management apparatus attached to a storage apparatus is provided with a function for defining secondary volumes in the storage apparatus in association with primary volumes, which are write/read-accessed by the host computer(s).

A primary volume is an online volume that the host computer(s) can access online, while a secondary volume is the replica of a particular primary volume. A volume management program in a storage apparatus recognizes each secondary volume as a volume that is paired with a particular primary volume to mirror that primary volume, and a write/read management program in the storage apparatus writes the relevant write data for a write command sent from a host computer to both the primary and secondary volumes. As a result, data in a primary volume is made consistent with data in the corresponding secondary volume, and users of the storage apparatus can utilize the secondary volume as a backup volume. A secondary volume like the above is also referred to as a replicated volume or a mirror volume.

In storage apparatuses where secondary volumes can be set, a plurality of secondary volumes is required [for one primary volume] in some cases. For example, single or several users may need to use a plurality of secondary volumes—one for backup, one for testing, and one for batch processing, and so on. For example, JP 2006-031579 A discloses a storage apparatus that can generate a plurality of secondary volumes (N volumes) for one primary volume.

SUMMARY

In storage apparatuses that can set a plurality of secondary volumes [for one primary volume], it is necessary to guarantee data consistency between the secondary volumes. So, that type of storage apparatus sets each of the secondary volumes, which are prepared for a particular primary volume accessed by the host computer(s), as volumes forming synchronous pairs with the primary volume. Consequently, if a host computer write-accesses the primary volume, the storage apparatus has to process that write access by accessing not only the primary volume but also each of the several secondary volumes to write the relevant write data. As a result, it may take a longer time for the storage apparatus to respond to the host computer to report the completion of the write processing, resulting in low processing efficiency in the storage apparatus concerning write commands from the host computers. In particular, if one processor is used to execute write processing for both the primary volume and each of the several secondary volumes, the load on the processor increases considerably, causing a significant decrease in processing efficiency.

Meanwhile, in high-performance storage apparatuses, i.e., so-called high-end type storage apparatuses, processors are provided both on the (front-end) side facing the host computer(s) and on the (back-end) side facing the hard disks. In that type of storage apparatus, data write to a primary volume and data copy from the primary volume to the secondary volumes can be executed separately by the plural processors. Accordingly, in the storage apparatus as a whole, an increase in the load on the processors can be reduced.

However, when copying the write data from the primary volume to the several secondary volumes, I/O access to the primary volume increases within the storage apparatus, which may affect other write/read access from the host computers targeting that primary volume. Also, in storage apparatuses where processing on the front-end side and processing on the back-end side are executed by the same processor, i.e., so-called middle-range type storage apparatuses, if write processing is going to be executed for all of the secondary volumes simultaneously with the write processing for the primary volume, the load on the processor will inevitably increase. So, in those middle-range type storage apparatuses, the number of secondary volumes that can form a synchronous pair with a particular primary volume has had to be limited.

In light of the above, it is an object of the present invention to provide a storage apparatus and a storage control method that do not increase the I/O load on a primary volume, even if there are several secondary volumes for which data consistency with the primary volume should be guaranteed. Also, it is another object of the present invention to provide a storage apparatus and a storage control method that do not increase the load on a processor, even if there are several secondary volumes like the above.

In order to achieve the above objects, a storage apparatus according to the present invention is characterized in that write data sent from a host computer directed to a primary volume is copied from one secondary volume (main-volume) paired with the primary volume to the paired secondary volumes other than the main-volume (sub-volumes) without accessing the primary volume, so that the primary volume can be less frequently accessed. In particular, by executing the above data copy from the main-volume to the sub-volumes in the background, the storage apparatus can prevent an increase in the load on the storage apparatus processor and the load on the primary volume.

According to the present invention, provided is a storage apparatus including: a storage unit; a controller for providing a host computer with a storage area in the storage unit as a plurality of volumes, and controlling access from the host computer to the volumes; and memory in which management information for managing the volumes is set, the controller being configured to control, in accordance with the management information, writing write data sent from the host computer to the volumes, wherein the plurality of volumes includes a primary volume that the host computer write-accesses and a plurality of secondary volumes that functions as a replicated volume for the primary volume, and the plurality of secondary volumes comprises a main-volume to which write data for write access from the host computer directed to the primary volume is written and a sub-volume that is subordinate to the main-volume, and wherein the controller is configured to write, upon receipt of the write access from the host computer, the write data to the primary volume and the main-volume, and also write the write data that has been written to the main-volume to the sub-volume.

Also, according to the present invention, provided is a storage control method using a storage apparatus that provides a host computer with storage volumes and controls write access from the host computer to the storage volumes, the method comprising: under control of the storage apparatus, generating, as the storage volumes, a primary volume that the host computer accesses and a plurality of secondary volumes that functions as a replicated volume for the primary volume; defining the plurality of secondary volumes as comprising a main-volume to which write data for write access from the host computer directed to the primary volume is written and a sub-volume that is subordinate to the main-volume; and upon receipt of the write access from the host computer, writing the write data to the primary volume and the main-volume, and also writing the write data that has been written to the main-volume to the sub-volume.

As stated above, according to the present invention, it is possible to provide a storage apparatus that does not increase the I/O load on a primary volume, even if there are several secondary volumes for which data consistency with the primary volume should be guaranteed. Furthermore, according to the present invention, it is possible to provide a storage apparatus and a storage control method that do not increase the load on a processor, even if there are several secondary volumes like the above.

Other aspects and advantages of the invention will be apparent from the following description and the appended claims.

DETAILED DESCRIPTION OF PREFERRED EMBODIMENTS

Figure 1:
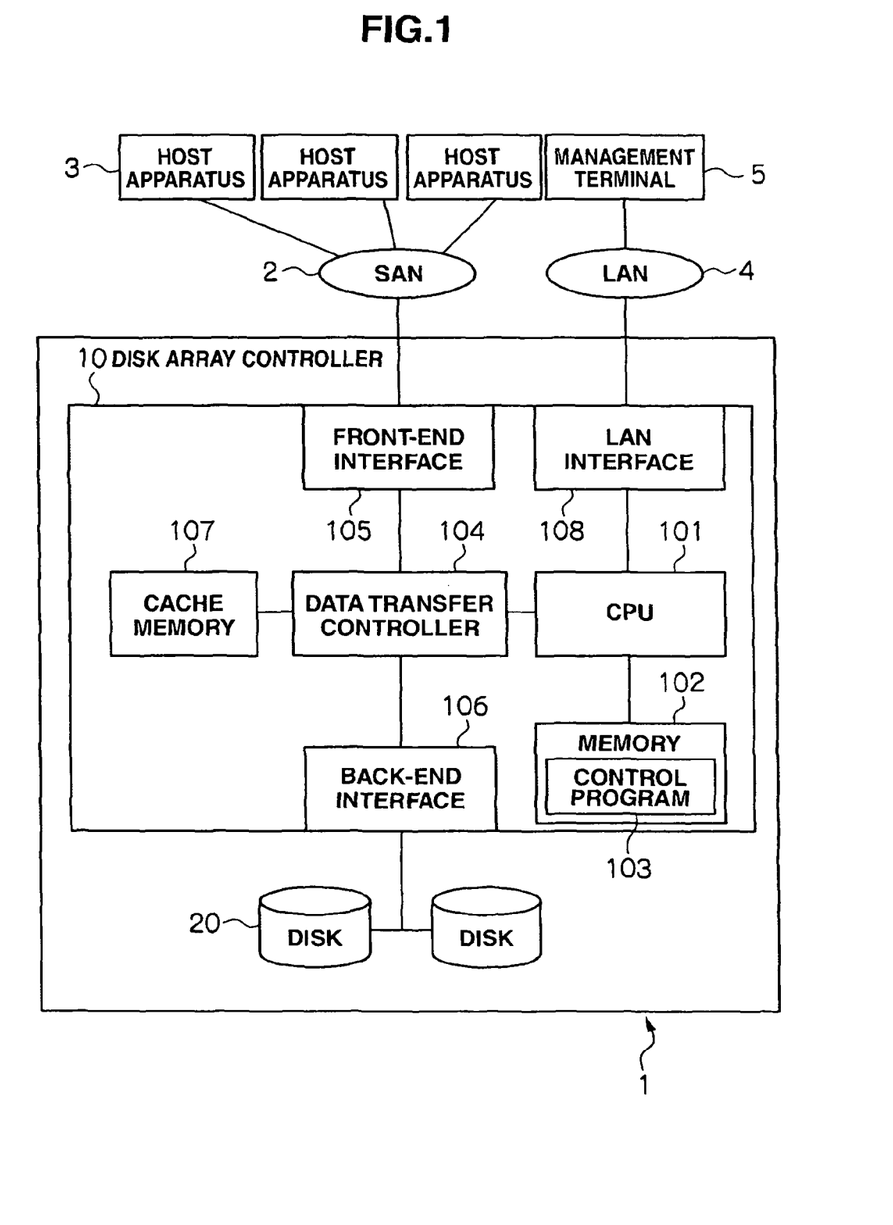
FIG. 1 is a hardware block diagram illustrating an example of a storage control system with a storage apparatus according to the invention.

An example of a storage control system with a storage apparatus according to the present invention will be explained below. FIG. 1 is a hardware block diagram of a storage control system. The storage apparatus shown in FIG. 1 is a middle-range model as explained above, but obviously, a high-end model storage apparatus may also be used.

In FIG. 1, the storage apparatus 1 is configured to include a controller and a plurality of storage devices. A disk array controller 10 corresponds to the controller, and a plurality of hard disk drives 20 corresponds to the plural storage devices. The storage devices are not limited to hard disk drives, and they may also be semiconductor memory, such as flash memory chips.

The storage apparatus 1 is connected to several host apparatuses 3 (which correspond to host computers) via a SAN (Storage Area Network) 2, and is also connected to a management terminal 5 via a LAN (Local Area Network) 4. Using a control program 103 stored in memory 102, the disk array controller 10 controls various kinds of processing, such as data input/output to/from the hard disk drives 20 requested by the host apparatuses 3, or management of volumes.

Storage resources provided by the hard disk drives 20 are defined based on RAID (Redundant Array of Independent Disks), and provided to the host apparatuses 3 as volumes. Storage areas provided by several storage devices are put together to form a RAID group based on a particular RAID level. The storage apparatus 1 logically divides that RAID group, and enables the host apparatuses to logically 'see' the divided group.

There are some variations in a logically defined unit that the host apparatuses can recognize, e.g. a logical volume, a logical unit, a virtual volume, a logical disk, and a virtual disk, depending on whether the host apparatuses are mainframes or open frames, or on the difference in communication protocol for use. In this specification, the term "volume" is used to indicate those varieties of logically defined unit. The host apparatuses access physical disks (PDEV) via the volumes.

For example, a logical volume is an entity in a SCSI target that executes an I/O command. Each logical volume is identified by the host apparatuses by its LUN (logical unit number). The disk array controller 10 stores control information for managing the LUs, i.e., volume management information including, for example, the logical volume number (LUN), logical address range, storage capacity, RAID level, and control status (as a primary/secondary volume), in the memory 102, and manages that information. The disk array controller also manages logical device numbers, which are the numbers for managing lower layer volumes (LDEVs) associated with the LUs. In the storage apparatus 1, various control information is changed as required.

In order to execute the control program 103, the disk array controller 10 is provided with a CPU 101 as a main processing controller, and memory 102 for storing the control program. Instead of the CPU 101, a microprocessor may also be used. By the control program being executed by the processor, each type of processing (explained later) is realized. When the CPU 101 calls and executes the control program 103, various processing is executed. The control program has function(s) necessary for realizing the storage control function, which the storage apparatus provides for the host apparatuses. In particular, the control program has a function for processing write/read access from the host apparatuses to the storage apparatus, and a function for generating, managing and controlling a primary volume and several [corresponding] secondary volumes.

In accordance with the above control program, the disk array controller 10 generates several secondary volumes in response to a command from the host apparatuses 3 or the management terminal 5, and stores [information about] the generated volumes in the memory 102, using the form of a management table. The control program controls data copy between the secondary volumes based on that management table.

The disk array controller 10 can set and control the volumes on a per-LU basis. The "volumes" includes primary volumes that the host apparatuses access, and secondary volumes each functioning as a replicated volume for a particular primary volume. If a host apparatus write-accesses a primary volume, the relevant write data is reflected in the corresponding secondary volume(s). The host apparatuses can obviously read-access the primary volumes too. Furthermore, the host apparatus can also write-access/read-access a secondary volume that has been split from its corresponding primary volume, which will be explained later.

The disk array controller 10 includes a data transfer controller 104, a front-end interface 105, a back-end interface 106, cache memory 107 and a LAN interface 108. The data transfer controller 104 controls data transfer between the CPU 101, front-end interface 105, back-end interface 106, and cache memory 107.

The front-end interface 105 is an interface to the SAN 2, and sends/receives data and control signals to/from the host apparatuses 3 based on, for example, Fiber Channel Protocol. The back-end interface 106 is an interface to the disk drives 20, and sends/receives data and control signals to/from the disk drives 20 based on, for example, Fiber Channel Protocol.

The cache memory 107 temporarily stores data to be sent/received between the front-end interface 105 and the back-end interface 106. In other words, data to be read/written from/to the disks via the SAN 2 is transferred by the data transfer controller 104 between the interfaces 105 and 106, and also to the cache memory 107.

The LAN interface 108 is an interface to the LAN 4, and it enables the management terminal 5 and the storage apparatus 1 to send/receive data and control signals between each other based on, for example, TCP/IP. The SAN 2 is a network where communication can be made based on a protocol suitable for data transfer, for example, Fibre Channel Protocol.

The management terminal 5 is a computer device provided with a CPU, memory, a storage unit, an interface, an input device and a display device. A management program runs on the management terminal 5, and by using this management program, the management terminal 5 knows the operation status of the storage apparatus and controls the storage apparatus operation. A client program, e.g. a web browser, also runs on the management terminal 5, and the management terminal 5 may also control the storage apparatus operation using a management program provided by the storage apparatus 1 via a CGI (Common Gateway Interface), or similar.

The management terminal 5 has a function for setting certain data in the memory 102 to realize various kinds of control over the disk array controller 10. The above function is available to the users via a GUI. In the above explanation, the host apparatuses use an internal program and set various management information for a primary volume and several [corresponding] secondary volumes, but the management terminal 5 may execute that setting instead. The above management function in the host apparatuses is also available to the administrators that manage the host apparatuses via a GUI. Each host apparatus 3 is a computer device provided with a CPU, memory, a storage unit, an interface, an input device and a display device, and each client for the host apparatuses can utilize database service, web service or similar using data provided from the storage apparatus 1.

An example of data input/output processing between the host apparatuses and the storage devices 20 is as follows: For example, if the CPU 101 in the controller 10 recognizes a data input/output command received from a particular host apparatus 3 as being a write command, the CPU 101 writes that write command to the memory 102, makes the data transfer controller 104 write the relevant write data received from the host apparatus to the cache memory 107, and then reports to the host apparatus that the write command has been executed.

Then, the CPU 101 makes the data transfer controller 104 read the write data from the cache memory 107 and write it to the storage devices 20. A read command from the host apparatuses is also executed in the same way. More specifically, if the CPU 101 recognizes a command as being a read command, the CPU 101 writes the read command to the memory 102, and checks whether the target read data is in the cache memory 107 or not. If the target read data is in the cache memory, the CPU 101 instructs the data transfer controller to send that data via the front-end interface. If the target read data is not in the cache memory 107, the data transfer controller 104 reads that data from the relevant disk drive(s) 20 and transfers it to the host apparatus.

Figure 2:
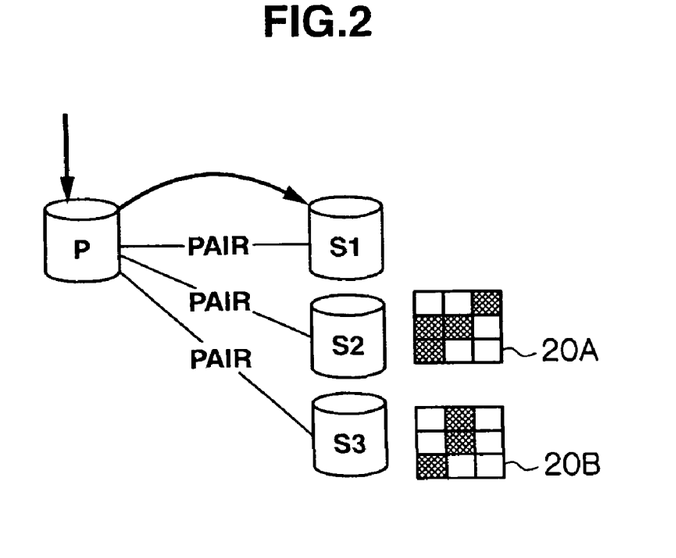
FIG. 2 is a block diagram illustrating the relationship between primary volumes and secondary volumes in a storage apparatus according to the invention.

Referring next to the block diagram in FIG. 2, the relationship between the primary volumes and the secondary volumes in the storage apparatus 1 will be explained below. The relationship shown in FIG. 2 is recorded in a specific area in the memory 102 as management information. More specifically, with regard to each volume, whether it is a primary or secondary volume; whether it is a main-volume or a sub-volume if it is a secondary volume; and the fact that it is paired with the corresponding primary/secondary volume is stored in the memory 102 in FIG. 1, in the form of a management control table.

The reference character "P" represents a primary volume, which is a volume that the host apparatuses 3 access to read/write data from/to the storage apparatus 1; while the reference character "S" represents a secondary volume, which is a volume that functions as the replica of a primary volume, and several secondary volumes S1, S2, and S3 are prepared for one primary volume P.

The secondary volume S1 is the main-volume that forms a synchronous pair with the primary volume P. If a write command targeting the primary volume P is issued from a host apparatus 3 to the storage apparatus 1, the disk array controller 10 executes write processing for both the primary volume (P) and the secondary volume (S1). The write processing for both volumes is preferably executed at the same time. Each of the secondary volumes S1, S2, and S3 is defined as a member of a group that guarantees consistency in data with the primary volume (P).

Unlike the main-volume (S1), in which the relevant write data is stored at the same time when the write processing is executed for the primary volume (P), each of the secondary volumes S2 and S3 is a sub-volume, subordinate to the main-volume S1, and to which the write data is to be copied by the CPU 101 in background processing. However, since the secondary volumes S1-S3 are defined as a group that guarantees consistency in data with the primary volume P, they are paired with the primary volume P. Obviously, the pair setting of the main-volume S1 with the primary volume P and the pair setting of the sub-volumes S2 and S3 with the primary volume P are different. The former pair is a "synchronous pair" and the latter is an "asynchronous pair." In a volume management table, the volume S1 is set as a synchronous pair and the volumes S2 and S3 are set as asynchronous pairs.

Figure 3:
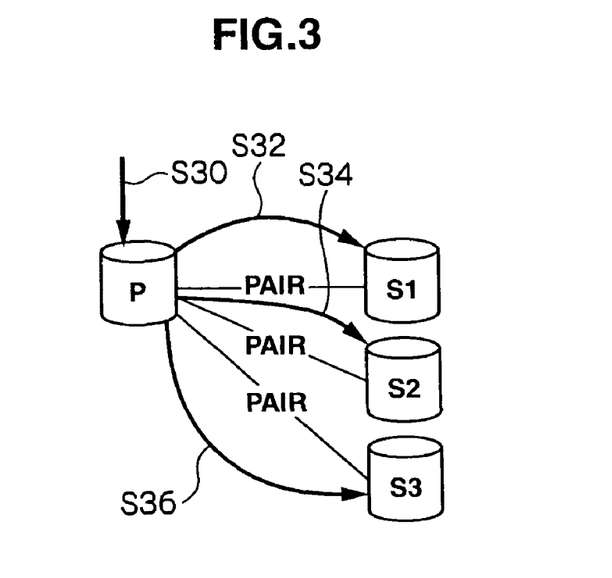
FIG. 3 is a block diagram illustrating the relationship between primary volumes and secondary volumes in a conventional storage apparatus.

FIG. 3 is a block diagram of a conventional configuration where each of the secondary volumes S1, S2 and S3 forms a synchronous pair with the primary volume P. In FIG. 3, if a host apparatus 3 issues a write command to the storage apparatus 1, the storage apparatus executes write processing (S30) for the primary volume and write processing (S32-S36) for each of the three secondary volumes. In other words, the storage apparatus 1 needs to execute, as foreground processing, write processing four times in total every time it receives a write command from the host apparatuses. That increases the load on the CPU 101, and increases the I/O load on the primary volume too.

On the other hand, in an embodiment of the present invention shown in FIG. 2, all that the CPU 101 has to execute when it receives a write command from the host apparatuses is two lots of write processing—for the primary volume P and for the main-volume S1. The relevant write data is copied from the main-volume S1 to the other secondary volumes S2 and S3 in the background processing, which prevents increase in the load on the CPU and in the load on the primary volume P as well. Note that the background processing here means, for example, processing executed by the controller behind the foreground processing when the operating rate of the controller is low. In the secondary volumes paired with the same primary volume, data copy is executed from the main-volume to the sub-volumes in the background processing, so the host apparatuses can use a secondary volume immediately after it has been split from the primary volume.

In FIGS. 2 and 3, if a secondary volume is separated (split) from the pairing with the primary volume, the host apparatus is permitted to access that secondary volume. Thus, in the storage apparatus in FIG. 3, in order for the secondary volumes to be able to be split from the primary volume at any time, the write data written to the primary volume P needs to be written to all the secondary volumes simultaneously, or if not simultaneously, with a considerably short delay. On the other hand, in FIG. 2, the write data written to the main volume has only to be reflected in the sub-volume(s), for example, at the point in time when the relevant secondary volume(s) have been split. In other words, the controller can reflect the write data in the sub-volumes in the background processing.

In order to reduce the load on the disk array controller 10, reflecting the write data in the main-volume (S1) in the sub-volumes (S2, S3) is controlled using, for example, bitmaps. In FIG. 2, the reference numerals 20A and 20B indicate bitmaps. The bitmap is control information indicating in which areas in the main-volume the sub-volume shares data with the main-volume.

A bitmap is a map for multiple bits, and one bit corresponds to a particular size of block (e.g. a block of 64 kilobits) in a logical address in the main-volume. If a flag of "1" is set for a particular bit (BT), it shows that the area (A) in the main-volume that corresponds to that bit (BT), and the corresponding area (B) in the sub-volume share common data.

If the primary volume P is write-accessed by the host apparatus 3, and if the controller 10 writes the relevant write data to the area (A) in the main-volume, the controller does not write the write data to the area (B) in the sub-volume, but just sets "1" for the specific bit (BT) on the bitmap 20 for the sub-volume. A bitmap is prepared for each sub-volume. The reference numeral 20A indicates a bitmap for the sub-volume S2, and the reference numeral 20B indicates a bitmap for the sub-volume S3.

Each bitmap is prepared in the cache memory 107, or in the management area in the control memory 102. Setting of a flag for each bitmap is executed by the CPU 101 based on the control program in accordance with a write command issued from the host apparatus. The association between the logical addresses in the primary volume and the logical addresses in the secondary volume S1, and the association between the logical addresses in the respective secondary volumes S1, S2 and S3 are recorded in the memory 102. The CPU 101 determines the bit position on the bitmap for which a 'shared' flag is to be set, based on the destination address for the write access to the primary volume.

When the CPU 101 receives a write command from the host apparatus, the CPU 101 sets a flag for the specific bit(s) on the bitmaps for the sub-volumes S2 and S3, the flag showing that the bit position is an area that shares data with the main-volume, unlike in the conventional configuration (FIG. 3) where the CPU writes the relevant write data simultaneously to the sub-volumes S2 and S3. The CPU 101 can set a 'shared' flag of "1" for the specific bit on the bitmap in a shorter time than the time taken to write the write data to the relevant storage area in the sub-volumes. Accordingly, almost no increase occurs in the I/O load on the CPU.

Data in the main-volume is reflected in the sub-volumes by the controller 10 as appropriate. For example, the controller 10 reflects data if the main-volume is to be separated (split) from the pairing with the primary volume. The controller may also reflect data if the CPU operating rate is equal to or smaller than a specific value. Alternatively, the above reflection may be controlled by a time-related factor, e.g. the reflection is conducted at a specified time. Like the main-volume, the sub-volumes are in the group in which data consistency with the primary volume is ensured, so data copy from the main-volume to the sub-volumes is required.

If the main-volume is split from the primary volume, the attribute of the main-volume is changed to a "sub-volume" in the control table in the memory. If there is only one corresponding sub-volume, the attribute of that sub-volume is changed to a "main-volume," and if there are several corresponding sub-volumes, the attribute of one of the sub-volumes is changed to a "main-volume."

Referring to the bitmap information, the CPU 101 copies data from the previous main-volume to the secondary volume that has been changed from the sub-volume to the new main-volume. More specifically, the CPU detects any bit with a flag of "1" in the bitmap table, reads data from the area in the previous main-volume that corresponds to the detected bit, and writes the read data to the corresponding storage area in the sub-volume, which has been changed to the new main-volume.

Figure 4:
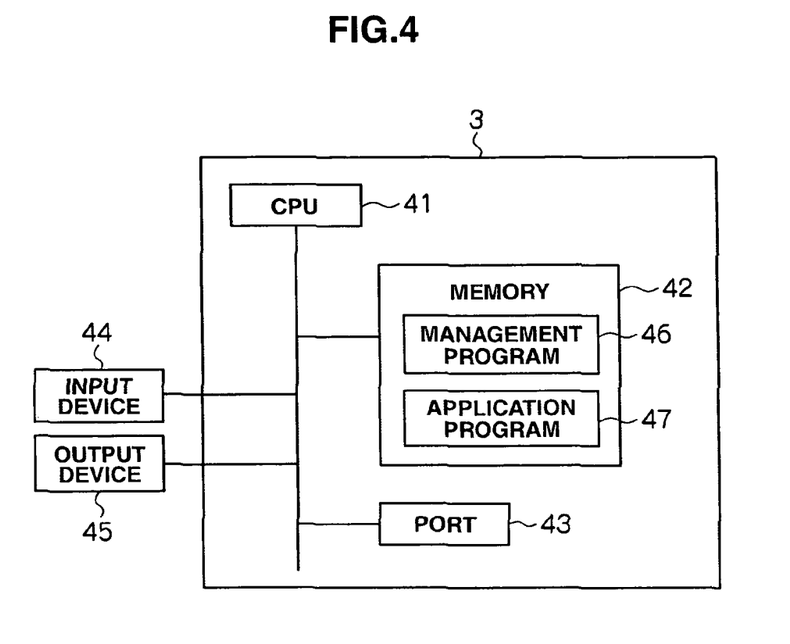
FIG. 4 is a hardware block diagram of a host apparatus.

FIG. 4 is a block diagram illustrating the hardware configuration of a host apparatus. A host apparatus is a computer having a CPU 41, memory 42 and a port 43, and an input device 44, e.g. a keyboard or mouse, and an output device 45, e.g. a display, connected. The host apparatus is, for example, a personal computer, a workstation, a mainframe computer, or a computer dedicated for a server. A management program 46 for managing the primary volumes and the secondary volumes, and an application program 47 are stored in the memory 42, and the CPU 41 realizes various functions by executing those programs.

The management program 46 for managing the primary volumes and the secondary volumes is a program for executing processing for issuing a command to the storage apparatus to make the storage apparatus function to generate a primary volume and several corresponding secondary volumes, together with providing a user interface for that processing. The application program 47 is a program for the host apparatus to conduct normal operational processing or similar. Examples of the operational processing include processing in an automated teller machine system in a bank. The port 43 is a communication interface connected to the SAN 2, for establishing communication with the storage apparatus and with other host apparatuses, etc.

During normal operation, the host apparatus reads data stored in the storage devices and writes data to the storage devices by sending data input/output commands, such as read commands and write commands, to the storage apparatus. The management program and the application program are read from a storage medium (e.g. CD-ROM) or an external storage apparatus (not shown in the drawing), or alternatively received from the outside via the network, and then stored in the memory.

Using the input device and the output device, as well as a user interface provided in the management program, an operator (user) of the host apparatus inputs a command to instruct the storage apparatus to store data or to execute processing concerning the secondary volumes. For example, the operator inputs a command to instruct the storage apparatus to execute processing for generating several secondary volumes. The user interface in the management program 46 is, for example, of the GUI type, such as a Web browser, or of the CUI type (Command User Interface), or similar. Based on the commands input by the operator, the management program 46 issues corresponding commands. Then, the host apparatus sends, via the port 43 and the SAN 2, the issued command to the controller 10 in the destination storage apparatus from which the relevant processing is requested.

The command sent is received at a port in the storage apparatus. The management program 46 can make a request to the storage apparatus to generate several secondary volumes on a per-LU basis. An operator (user) that uses the host apparatus conducts processing on a per-LU basis, using the user interface in the management program 46. For example, the operator designates a primary volume as a replication source, or a secondary volume as a replication destination, to the storage apparatus using its logical volume number (LUN).

The management program 46 makes the CPU in the host apparatus execute processing for listing various information managed in the storage apparatus. For example, the management program can instruct the CPU to list the LUs that are prepared in the storage apparatus and available to the user, and the user can select, from among the listed LUs, a primary volume to be a replication source, or any secondary volume associated with a primary volume.

Next, the control status of each pair set between the primary volumes and the secondary volumes in the storage apparatus will be explained below. In the storage apparatus 1 in accordance with commands or similar issued from the management program 46 in the host apparatus, the control status of pairs set between the volumes (pair control status) is changed, and the primary and secondary volumes are processed and controlled according to the pair control information.

The controller 10 in the storage apparatus 1 generates pairs between the storage volumes, as instructed by the operator that uses the host apparatus. As for the relationship between the primary and secondary volumes, there is a "paired" state where two volumes are paired and a "split" state where two volumes are separated from each other.

In the storage apparatus, in accordance with commands or similar issued from the management program 46 in the host apparatus, the pair control status for each pair of the primary and secondary volumes is changed between the "paired" state and the "split" state. In the "paired" state, at the same time the primary volume is write-accessed by the host apparatus, the relevant write data is written to both the primary volume P and the secondary volume S1.

Referring back to FIG. 2, each of the secondary volumes (S1, S2, S3) is set as being paired with the primary volume, but the paired state of the main-volume S1 is different from the states of the sub-volume S2 and S3. The main-volume S1 forms a synchronous pair with the primary volume, while the sub-volumes S2 and S3 each form an asynchronous pair.

When the secondary volumes S2 and S3 are in the asynchronous-pair state for a sub-volume, the storage apparatus does not write the relevant write data to the storage area in the secondary volumes, but just records, on their bitmaps, which data stored in the main-volume is shared by the respective secondary volumes.

As part of the pair control operation, in accordance with commands (for example, pair generation commands) issued by the host apparatus, the storage apparatus executes processing for establishing pairs between the primary volumes and the secondary volumes. For example, the storage apparatus sets a new storage volume, or selects one from among the already-set storage volumes, as a volume to be paired with a particular primary volume. The storage apparatus executes initial copy processing for copying data from a source primary volume to all destination secondary volumes, and the pair control status of the secondary volumes relative to the primary volume is set to be the "paired" state ("synchronous/asynchronous-pair" state).

When a secondary volume is in the "synchronous-pair" state, the content of the data stored in the secondary volume is close to or the same as the content in the primary volume, as a result of update reflection processing executed at a particular time based on various conditions, such as the amount of data updated, or how much time has passed since an update has been made. The host apparatus is prohibited from accessing the secondary volumes in the "synchronous/asynchronous-pair" state. This is because such access affects data consistency between the secondary volumes and the primary volume.

When the secondary volume is in the "paired" state, if the storage apparatus receives from the host apparatus a command to split the pair (split command), the CPU 101 deletes the pairing of the target secondary volume with the primary volume (splits the two volumes), and then, the pair control status of the target secondary volume is changed from the "paired" state to the "split" state via the "copy" state, which is the state of transition. During that status change, any shared data is copied between the main-volume and the sub-volume (s) so that the content of the data in the main-volume and the content of the data in the sub-volume(s) completely match. If any write data is directed to the primary volume after it has been split, that write data is controlled using a difference bitmap. In the secondary volume in the "split" state, the content of the data in the primary volume is updated separately from the update of the data in the secondary volume.

Unlike in the "paired" state, the host apparatus is permitted to access the secondary volume in the "split" state. In the "split" state, any update to the primary volume is not reflected in the secondary volume. In the "split" state, the secondary volume is used for, for example, data backup processing, separately from the primary volume.

Because an update to the primary volume is not reflected in the split secondary volume, any update that has been made to the primary volume while the secondary volume is in the split state, and has not yet been reflected in the secondary volume is managed as difference data. Any new update made to the primary volume after it has been split is reflected in a secondary volume that is kept paired with the primary volume. When pairing the split secondary volume again with the primary volume, the above difference data is reflected in the secondary volume so that the data image of the secondary volume can be made consistent with that of the primary volume. The difference data is managed using a difference bitmap or a difference volume. More specifically, when the secondary volume is again changed from the "split" state to the "paired" state, mirroring processing is executed using the above difference volume or similar in accordance with a command for the above change (pair-resync command) sent from the host apparatus or the managing apparatus, so that the data in the secondary volume is made consistent with the data in the primary volume. As a result, the pair control status of the secondary volume is changed from the "split" state to the "paired" state via the "copy (resync)" state, i.e., the state of transition.

Figure 5:
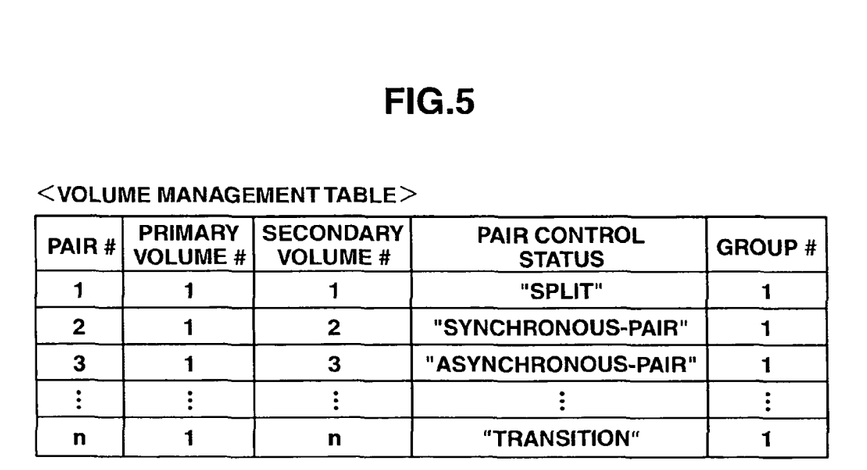
FIG. 5 illustrates an example of a volume management table.

FIG. 5 illustrates a volume management table 31 that the controller 10 manages in relation to the pair control status. The volume management table 31 is to specify the pairing relationship between the volumes. Pair control information to be specified and stored in this table includes: the pair number, the primary volume number, the secondary volume number, whether the secondary volume is the main-volume or a sub-volume, the pair control status, and the group number, etc. In FIG. 5, "#" represents a number. The pair number is information for identifying each pair, and a processing target logical volume can be designated by the host apparatus using that pair number. In this management table, the main-volume and the sub-volume are set as "Main" and "Sub," respectively.

The primary volume number and the secondary volume number are information for identifying each primary volume and each secondary volume, respectively. The pair control status is information indicating the control status of each pair in the storage apparatus 1. As described before, the control status includes: the "split" state, "synchronous-pair" state, "asynchronous-pair" state, and "transition" state. In the example shown in FIG. 5, the secondary volume (#2) set as forming a synchronous pair is the main-volume, and the secondary volume (#3) set as forming an asynchronous pair is a sub-volume. The group number is information for identifying the consistency group that the relevant pair belongs to.

In the example shown in FIG. 5, the pair having a pair number of #1 is made from the storage volume having a primary volume number of #1 and the storage volume having a secondary volume number of #1, its pair control status is the "split" state, and it belongs to the consistency group having a group number of #1. In the storage apparatus, pairs #1-#n (n pairs) are set to be included in the same consistency group. Secondary volumes that belong to the same consistency group and whose pair control status is the "synchronous-pair" state or the "asynchronous-pair" state are volumes having data consistent with the data in the primary volume.

In the "split" state, access to the secondary volume (#1) for update is accepted, and the secondary volume is updated independently from update to the primary volume. While the secondary volume is in the "split" state, because access to that secondary volume is accepted, the host apparatus can, for example, continue online operation using data in the primary volume, and, at the same time, separately from that operation, execute backup processing or other similar processing using data in the secondary volume. Upon receipt of a command to change the "split" state to the "paired" state (pair-resync command), re-mirroring processing is executed in the storage apparatus 1 to reflect difference data arising from any update made to the primary volume while the secondary volume is in the "split" state to the secondary volume, and thereby make the content of the data in the two volumes consistent with each other.

Setting and changing of the pair control status can be realized by the host apparatus operator by inputting instructions based on the replication management program [46] to issue relevant commands. Together with the pair control status having been changed, the disk array controller 10 updates the pair control status in the volume management table 31. Note that, instead of starting to change the pair control status in accordance with instructions input by the host apparatus operator, it is also possible to make a particular setting via the replication management program 46 so that change of the pair control status is automatically started at a specified time. Alternatively, the replication management program in the host apparatus may start that change upon receipt of an instruction from other host apparatuses connected via the SAN 2.

The consistency group, which is part of the control information in the storage apparatus 1, will be explained next. One consistency group is generated from one primary volume and its corresponding several secondary volumes specified. That consistency group is a collection of pairs in which each secondary volume ensures data consistency with the primary volume. As already stated before, the secondary volumes forming one consistency group includes a main-volume that forms a synchronous pair with the primary volume and sub-volume(s) that form asynchronous pairs with the primary volume.

Any data write or update to the primary volume is reflected in the main-volume. Meanwhile, data related to that data write or update to the primary volume is not copied directly from the primary volume to the sub-volume(s), but instead, the disk array controller sets sharing state identification information on the 'shared' bitmap(s) prepared for the sub-volume(s). When changing one sub-volume to the main-volume, or releasing one sub-volume from the consistency group so that it is used for the host apparatus operational processing, the disk array controller refers to the above 'shared' bitmap and copies the relevant data from the main-volume [or the former main-volume]. When deleting the pairing of one secondary volume with the corresponding primary volume, or when removing one secondary volume from the consistency group, data copy is executed between the several relevant secondary volumes.

When the primary volume is I/O-accessed by the host apparatus, the disk array controller refers to the volume management table and writes the relevant write data to both the primary volume and the main-volume paired with that primary volume. If a certain event occurs, for example, if the main-volume has been split from the primary volume and one sub-volume has been changed to the [new] main-volume, or at a specified time, or at specified time intervals, the disk array controller reflects data in the main-volume to the relevant sub-volume(s).

Figure 6:
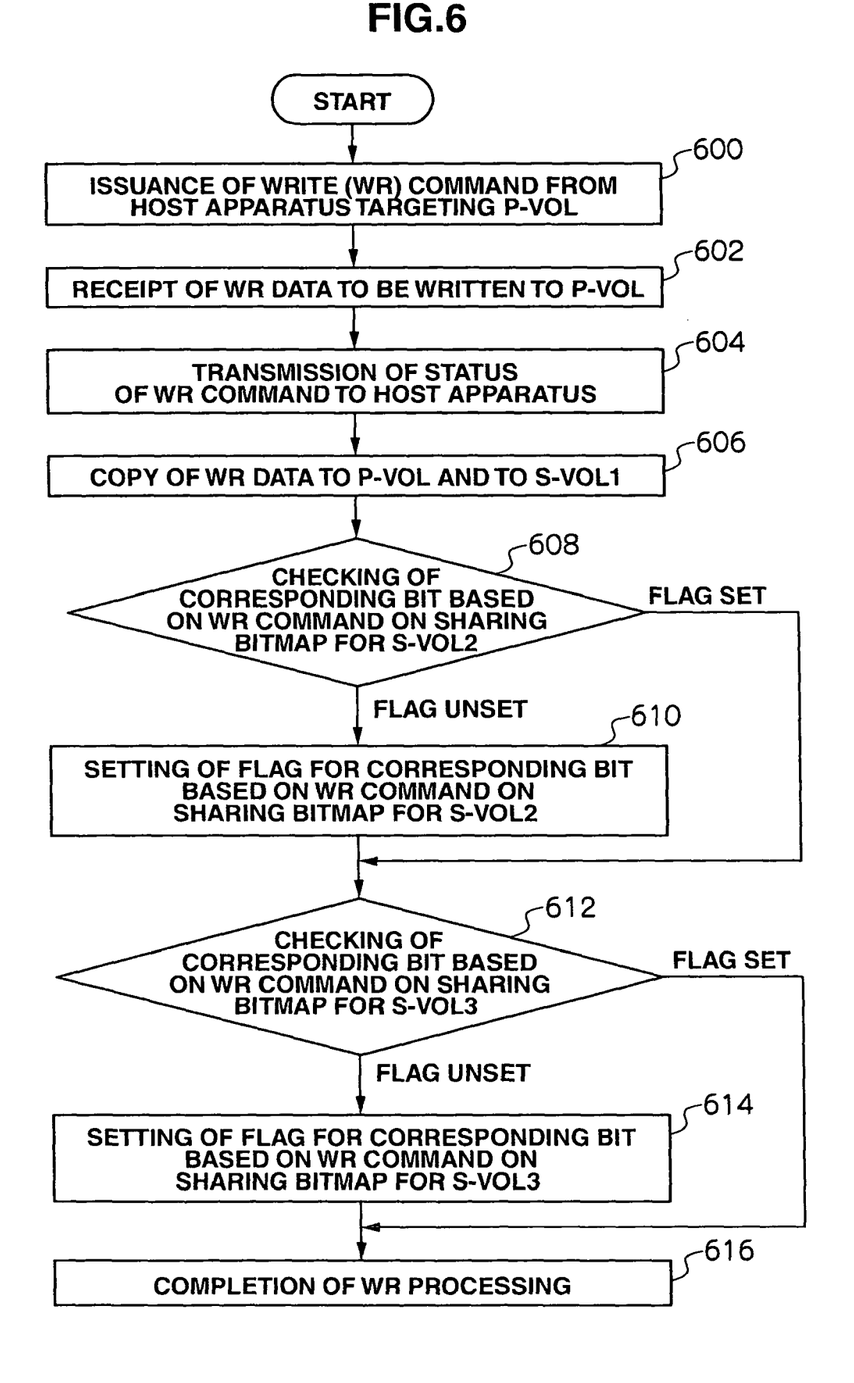
FIG. 6 illustrates the flow of processing where a primary volume is write-accessed by a host apparatus.

FIG. 6 is a flowchart showing processing executed when a host apparatus issues a write command directed to a primary volume. This processing will be explained, also referring to FIG. 2. The host apparatus 3 issues a write command targeting the primary volume P in the storage apparatus 1 (600). When receiving the write command targeting the primary volume with the relevant write data, the controller 10 in the storage apparatus 1 writes that write data to the cache memory 107 (602). The controller 10 then reports to the host apparatus that the write command has been completed (604). The controller 10 writes the write data stored in the cache memory to the primary volume and to the [corresponding] main-volume (606). The CPU 101 refers to the control table shown in FIG. 5, and recognizes the main-volume in which the write data is to be reflected. In the example in FIG. 2, the controller recognizes the secondary volume S1 as the main-volume.

Then, the controller 10 checks whether a 'shared' flag has been set for a particular bit on the 'shared' bitmap prepared for the sub-volume S2, the bit being specified based on the write command (608). If a 'shared' flag has been set, the controller goes to step 612, and if not, the controller sets a 'shared' flag for that bit (610).

The controller also checks whether a 'shared' flag has been set for the specified bit on the 'shared' bitmap prepared for the sub-volume S3 (612). If a 'shared' flag has been set, the controller ends the write processing, and if not, the controller sets a 'shared' flag for that specified bit on the bitmap for the sub-volume S3. As a result of the above-described steps, processing executed in response to write access from the host apparatus has been completed.

Figure 7:
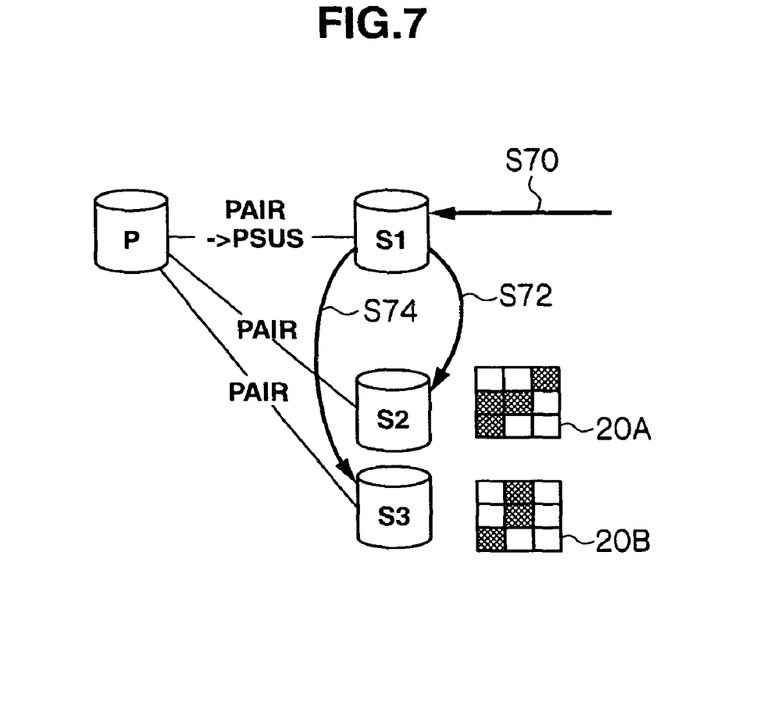
FIG. 7 is a block diagram of a primary volume and secondary volumes, illustrating an example of write processing executed for the primary volume and secondary volumes in accordance with a command from a host apparatus.

FIG. 7 is a block diagram showing the processes where the secondary volume S1 functioning as the main-volume has been split from the primary volume P, and instead, the sub-volume S2 has been changed to the main-volume forming a pair with the primary volume.

The host apparatus issues a split command targeting the main-volume S1 in the storage apparatus (S70). The controller 10 changes the control status of the volume S1 in the table shown in FIG. 5. The status has been changed initially to "transition," and then to "split." While the volume S1 is in the "transition" control status, any data not yet reflected in the volume S1 is read from the cache memory and written to the volume S1, and furthermore, the shared data is copied from the main-volume S1 to the sub-volumes S2 and S3 (S72, S74).

Meanwhile, the pair control status of the sub-volume S2 is changed from "asynchronous-pair" to "synchronous-pair." Note that, in one consistency group, at least one secondary volume is set as being in the "synchronous-pair" state. If the above request for change is directed to a volume management information table with no synchronous pair, the controller returns an error message to the host apparatus.

If there are several sub-volumes when the main-volume has been split, one of them is changed to the [new] main-volume. This change is executed by the disk array controller 10 in accordance with a request from the host apparatus or the management terminal. An administrator arbitrarily selects one from among the several sub-volumes as a secondary volume to be changed to the main-volume. That selection may be conducted by the disk array controller by comparing the attributes of the several sub-volumes.

For example, the disk array controller scans the 'shared' bitmap for each of the several sub-volumes, and selects the one whose 'shared' bitmap includes the least 'shared' flags. Alternatively, the above selection may be executed by the storage apparatus, and thereafter be judged by the administrator regarding whether it is acceptable or not. In FIG. 7, the secondary volume S2 has been changed to the main-volume.

If the disk array controller 10 detects a split command targeting the main-volume S1, the disk array controller checks the cache memory to judge whether there is any write data that has been sent from the host apparatus targeting the primary volume and not yet copied to the main-volume S1. If there is data not yet copied, the disk array controller reads the relevant data from the cache memory and writes it to the main-volume S1. This processing is executed while the volume S1 is in the state of "transition" in the volume management table. When the necessary processing to be executed during the state of "transition" has been completed, the status for the volume is changed to the "split" state.

The disk array controller refers to the 'shared' bitmap 20A for the secondary volume S2. The disk array controller scans the 'shared' bitmap from the beginning, reads the data stored in specific areas in the secondary volume S1, the areas being associated with all the set 'shared' flags, and copies the read data to the corresponding areas in the secondary volume S2 (S72). With regard to the areas where no 'shared' flag is set, the data in the secondary volume S1 has already been reflected to the secondary volume S2, or no write data has been written to the corresponding area in the main-volume S1, so no data copy from the secondary volume S1 is executed. The disk array controller executes the above processing for the overall bitmap. Every time the shared data has been copied, the controller clears the relevant 'shared' flag.

Since the secondary volume S3 is kept as being a sub-volume, the shared data does not necessarily have to be copied to the secondary volume S3. If the shared data is not copied, a new 'shared' bitmap is made for the sub-volume S3 in association with the [new] main-volume S2.

FIG. 7 shows that the controller executes the copying of the shared data for both the secondary volume S2 and the secondary volume S3. The reference numeral 20B indicates the 'shared' bitmap set for the sub-volume S3, and the reference numeral S74 shows that the shared data has been copied from the main-volume S1 to the volume S3.

Figure 8:
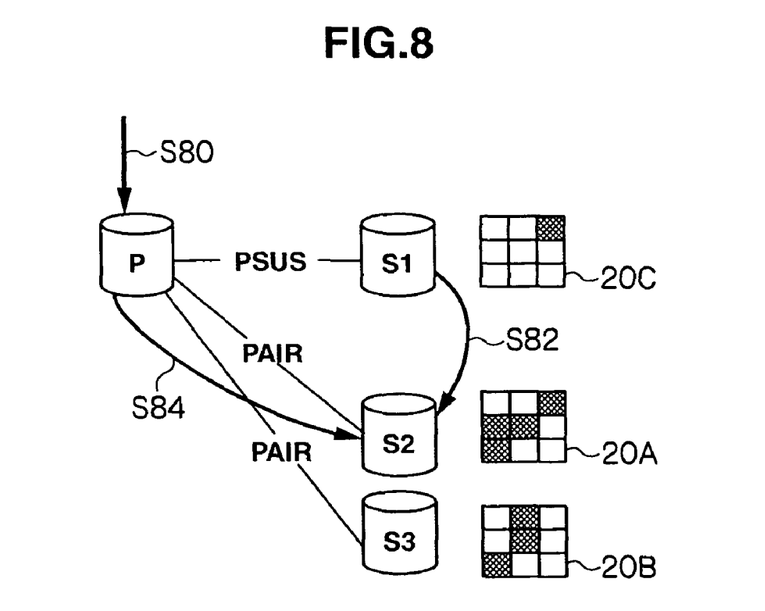
FIG. 8 is a block diagram illustrating the processing steps that follow FIG. 7.

Referring next to FIG. 8, the disk array controller accepts write-access from the host apparatus to the primary volume P (S80) during the background copy of the shared data to the secondary volume S2, so that the host apparatus can continue accessing the storage apparatus online. In the above, before completion of the copy of the shared data, if the relevant write data is written to an area in the volume S2 to which certain shared data needs to be copied from the volume S1, the data in the volume S2 will be inconsistent with the data in the primary volume P. So, in order to avoid such inconvenience, the storage apparatus controls data write to the secondary volume S2 as follows.

If the primary volume is write-accessed by the host apparatus (S80) before the background copy of the shared data has been completed, the disk array controller checks the corresponding destination in the main-volume S2 for that write-access to find out whether the destination is an area for which the copying of the shared data is required or not, and if it is required, also checks whether the copying has been completed or not.

The above check can be realized by the controller referring to the 'shared' bitmap 20A. If the copying of the shared data has not yet been completed, that can be seen from the relevant 'shared' flag still being set. The controller refers to the bitmap 20A, and checks, in accordance with the control program, whether any 'shared' flag remains set and not cleared. If there is one, the controller checks whether that flag is the 'shared' flag set for an area in the volume S2, which is the corresponding destination for the write access. If no 'shared' flag remains, the controller writes the relevant write data to the secondary volume S2, straight after the data write to the primary volume. Even if there is a 'shared' flag, the controller writes the relevant write data to the secondary volume S2, straight after the data write to the primary volume, if the flag is not a 'shared' flag set for the corresponding destination area for the write access.

On the other hand, if the controller refers to the bitmap and finds a 'shared' flag still set (and not yet cleared) in the bitmap, for an area in the volume S2 to which certain shared data needs to be copied from the volume S1, the controller reads the relevant write data to be written to the primary volume from the cache memory after the completion of the copying of the shared data (S82), and writes it to the volume S2 (S84). The controller judges the completion of the copying of the shared data, by repeatedly scanning the bitmap 20A at certain time intervals until it finds that the bit(s) with a 'shared' flag have been reset.

If the corresponding destination in the main-volume S2 for the write access is an area to which the copying of the shared data has already been completed from the secondary volume S1, that can be seen from the relevant flag having been reset, as described above, so the controller writes the relevant write data to the main-volume S2, straight after the data write to the primary volume (S84).

The disk array controller then sets a 'shared' flag on the 'shared' bitmap for the sub-volume S3. This 'shared' bitmap is one prepared in association with the volume S2, i.e. the new main-volume. As explained before with reference to FIG. 7, the controller may refer to the bitmap 20B and copy the shared data from the volume S1 to the volume S3, when the former main-volume, i.e. the volume S1, has been split from the primary volume.

Furthermore, the disk array controller sets a difference flag in the difference bitmap 20C for the sub-volume S1. The 'shared' flag and the difference flag are associated with the write data written to the primary volume P. The 'shared' flag is set to the secondary volume S3 forming an asynchronous pair with the primary volume P, and the difference flag is set to the secondary volume S1 split from the primary volume P. The difference flag is associated with any difference data occurring after the split of the secondary volume from the primary volume. If the secondary volume S1 is again paired with the primary volume, the difference data will be reflected in the secondary volume S1 based on the difference bitmap and the difference flag.

During the data copy from the secondary volume S1 to the secondary volume S2, any write data arising from write access to the primary volume may be stored in the cache memory and reflected in the secondary volume S2 after the completion of the data copy. The 'shared' flag and the difference flag is set upon every write access to the primary volume.

Figure 9:
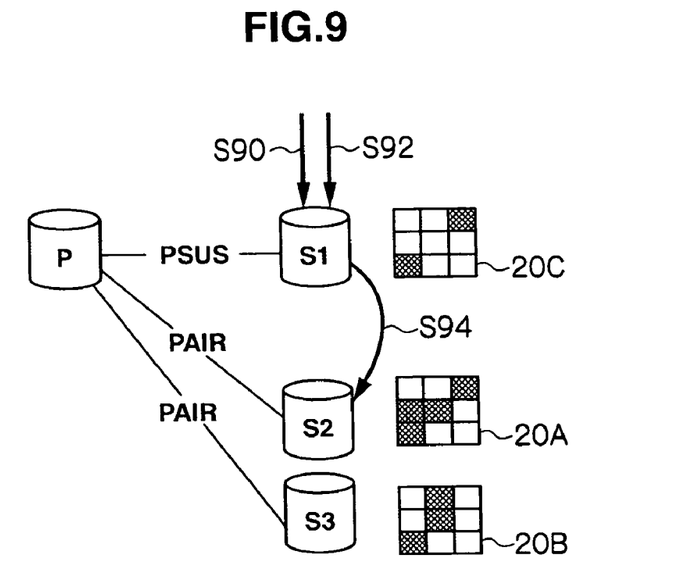
FIG. 9 is a block diagram illustrating the processing steps that follow FIG. 8.

Referring next to FIG. 9, processing executed when the volume S1, which has been changed to a sub-volume, is write-accessed by the host apparatus before the copying of the shared data has been completed from the volume S1 to the [new] main-volume S2 will be explained. The controller 10 receives a write command targeting the volume S1 from the host apparatus 3 (S90), and also receives the relevant write data (S92). The controller stores the write data in the cache memory, and after the copying of the shared data has been completed from the volume S1 to the volume S2 (S94), the controller reads the write data from the cache memory and writes it to the sub-volume S1. If not following the above steps, data in the volume S1 shared with the volume S2 (which is identical to the write data directed to the primary volume) will be changed before it is copied from the volume S1 to the volume S2.

Alternatively, the controller may refer to the 'shared' bitmap 20A, and write the relevant write data to the volume S1 (S92) while the background copying is being executed from the volume S1 to the volume S2, if it finds that the write command is directed to an area in the secondary volume S1 for which no 'shared' flag has been set.

Figure 10:
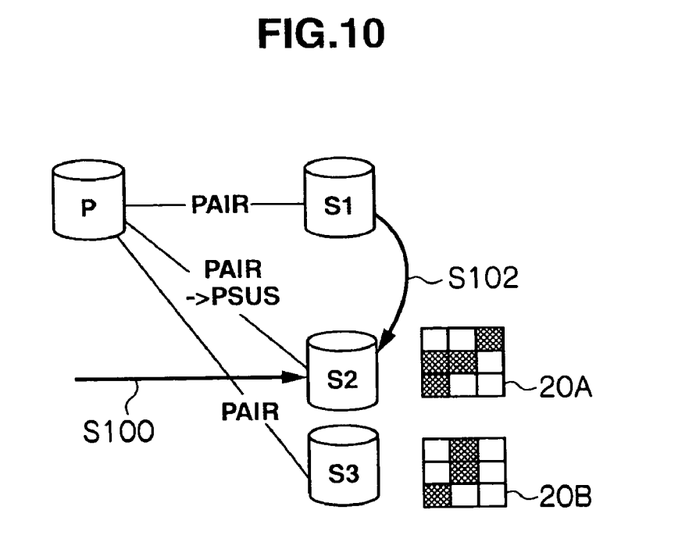
FIG. 10 is a block diagram of a primary volume and secondary volumes, illustrating another example of write-access processing executed for the primary volume in accordance with a command from a host apparatus.

Referring next to FIG. 10, processing executed when a split command is issued from the host apparatus to the storage apparatus, targeting the sub-volume S2 when it is in the asynchronous-pair state, not in the synchronous-pair state, relative to the primary volume will be explained. When splitting the secondary volume S2 from the primary volume P, the storage apparatus controls the secondary volume S2 so that it can hold the same data as the data stored in the secondary volume S1.

If the host apparatus issues a command to split the secondary volume S2 from the primary volume (S100), the storage apparatus changes the status of the secondary volume S2 in the volume management table from "asynchronous-pair" to "transition." Triggered by the above update to the management table, the controller refers to the 'shared' bitmap 20A for the secondary volume S2, and copies the shared data from the main-volume S1, which forms a synchronous pair with the primary volume, to the secondary volume S2 (S102).

Figure 11:
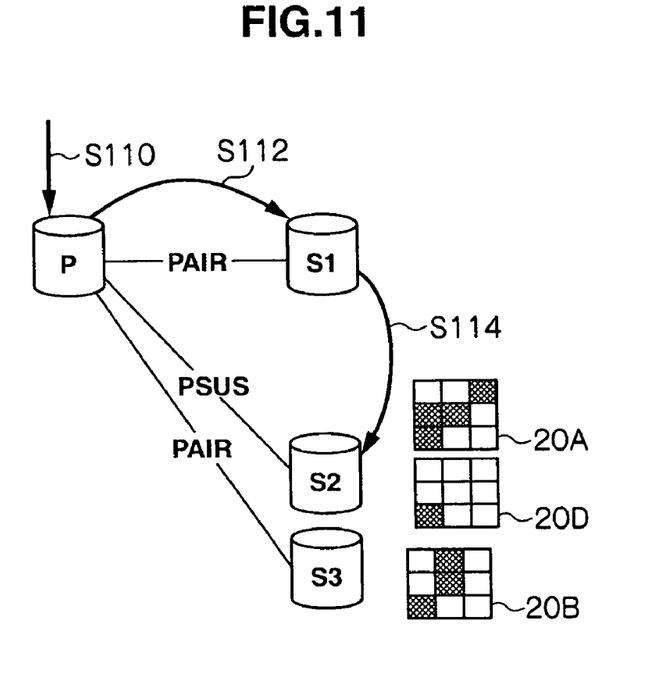
FIG. 11 is a block diagram illustrating the processing steps that follow FIG. 10.

As can been seen from FIG. 11, if a read/write management program in the storage apparatus receives a write command from the host apparatus (S110) during the above copying, it informs the volume management program in the storage apparatus of the corresponding destination address in the secondary volume S1. The read/write management program in the storage apparatus writes the relevant write data to the secondary volume S1 (S112).

Referring to the 'shared' bitmap 20A for the secondary volume S2, the volume management program checks whether any 'shared' flag has been set for the above destination address in the main-volume S1, and reports the result to the read/write management program.

If a 'shared' flag is set, i.e., if the address is an area in the secondary volume S1 from which the shared data needs to be copied to the secondary volume S2 (S114), the read/write management program waits to write the relevant write data to the secondary volume S1 until the copying has been completed. Note that the storage apparatus executes write processing for the primary volume straight after the receipt of the write command.

If the corresponding destination of the write data in the volume S1 is an area for which no 'shared' flag has been set on the 'shared' bitmap 20A for the secondary volume S2, the write data can be written to the main-volume S1 without waiting for the completion of the copying of the shared data from the secondary volume S1 to the secondary volume S2. Since the secondary volume S2 has already been split from the primary volume, there is no need to reflect the write data in the secondary volume S2. When the copying of the shared data from the secondary volume S1 to the secondary volume S2 has been completed, all flags on the 'shared' bitmap 20A are cleared.

Regarding any write data targeting the primary volume while the secondary volume S2 is in the state of being split from the primary volume P, the storage apparatus sets a difference flag on the difference bitmap 20D, and when pairing the secondary volume S2 again with the primary volume (synchronous or asynchronous pair), the storage apparatus refers to the difference bitmap and reflects the difference data arising during the period of being split in the secondary volume S2. The controller 10 in the storage apparatus refers to the difference bitmap 20D and copies the difference data from the secondary volume S1 to the secondary volume S2.

Figure 12:
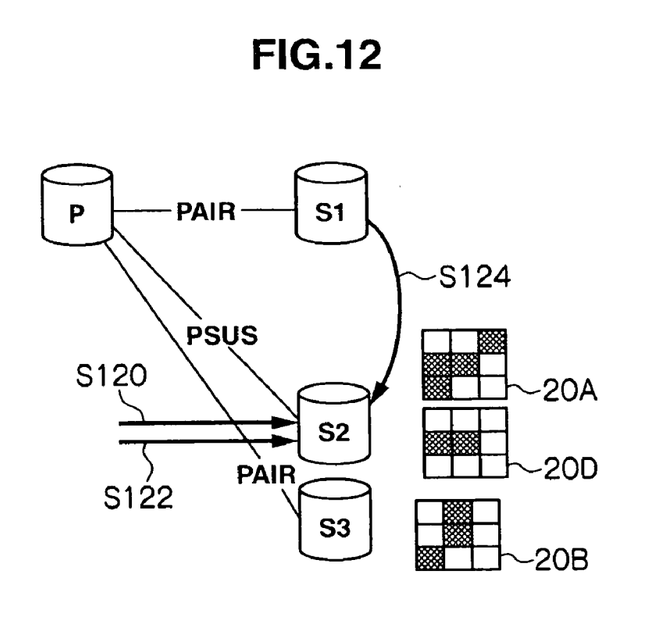
FIG. 12 is a block diagram illustrating the processing steps that follow FIG. 11.

FIG. 12 is a functional block diagram explaining control executed when the secondary volume S2, which has been split from the primary volume P, is accessed by the host apparatus (S120), while the background copy of the shared data is being executed from the secondary volume S1 to the secondary volume S2 (S124). Like the case shown in FIG. 11, in this case too, the storage apparatus checks whether the write access is directed to an area to which the shared data needs to be copied from the secondary volume S1, and if the answer is yes, the disk array controller writes the relevant write data to the secondary volume S2 (S122) after the copying from the volume S1 has been completed. On the other hand, if the write access is directed to an area to which the shared data doesn't need to be copied from the secondary volume S1, the storage apparatus writes the relevant write data to the secondary volume S2, straight after the receipt of the write command and the relevant data.

In the embodiment explained above, the controller writes the write data for write access from the host apparatus to a particular primary volume, to one of the corresponding secondary volumes, and the write data that has been written to the secondary volume is then copied to the other secondary volumes. Variations or modifications of the above embodiment include the following.

If duplex controllers or duplex processors are used, the background processing described above, and processing for write/read requests from the host apparatus may be executed by the separate controllers or processors.

Also, if a first write access has been made by a first host apparatus to a particular primary volume, but no second or further write/read access is made by a second or further host apparatus within a specified period of time after the first access, the controller may copy the relevant data from the primary volume to all the secondary volumes when executing write processing for the primary volume. Meanwhile, if the load on the primary volume is high, the controller copies the relevant write data from one secondary volume to the other secondary volumes in the background processing. In other words, how to copy the write data to the secondary volumes may be changed as described above, in accordance with the frequency and content of access from the controller to the primary volume. Furthermore, the method of copying the write data to the secondary volumes may also be changed as described above according to the load on the controller.

Also, if a sub-volume is read-accessed by the host apparatus after it has been split from the corresponding primary volume, the shared data is read from the main-volume, and after that, the relevant read data is sent back to the host apparatus. Furthermore, if the read access is directed to an area to which the shared data has not yet been copied from the main-volume, the shared data may be read from the main-volume, and then returned to the host apparatus.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage apparatus comprising:
a storage unit;
a controller for providing a host computer with a storage area in the storage unit as a plurality of volumes, and controlling access from the host computer to the volumes; and
memory in which management information for managing the volumes is set,
the controller being configured to control, in accordance with the management information, writing write data sent from the host computer to the volumes,
wherein the plurality of volumes includes a primary volume that the host computer write-accesses and a plurality of secondary volumes that functions as a replicated volume for the primary volume, and the plurality of secondary volumes comprises a main-volume to which write data for write access from the host computer directed to the primary volume is written and a plurality of sub-volumes that is subordinate to the main-volume,
wherein the main-volume forms a synchronous pair with the primary volume and the sub-volumes each form an asynchronous pair with the primary volume, and
wherein the controller is configured to write, upon receipt of the write access from the host computer, the write data to the primary volume and the main-volume, and then write the write data written to the main-volume to the plurality of sub-volumes later in background processing,
wherein when the synchronous pair between the primary volume and the main-volume is split state, the controller selects one of the sub-volumes and changes the asynchronous pair between the primary volume and the selected sub-volume to a synchronous pair, so that the controller is configured to write, upon receipt of the write access from the host computer, the write data to the primary volume and the selected sub-volume, and then write the write data written to the selected sub-volume to the plurality of sub-volumes other than the selected sub-volume later in the background processing.

2. The storage apparatus according to claim 1,
wherein the management information is a management table for the plurality of volumes, including information about the distinction between the primary volume, the secondary volumes, the main-volume, and the sub-volumes, and information indicating that the plurality of secondary volumes is included in a group where data consistency with the primary volume is guaranteed.

3. The storage apparatus according to claim 1,
wherein the controller copies data in the main-volume that is shared by the sub-volumes, from the main-volume to the sub-volumes.

4. The storage apparatus according to claim 3,
wherein the controller writes the write data to be written to the primary volume to the main-volume as the shared data, without initially writing that write data to the sub-volumes in the background processing.

5. The storage apparatus according to claim 4,
wherein the controller sets, in the management information, the main-volume as forming a synchronous pair with the primary volume, and the sub-volumes as each forming an asynchronous pair with the primary volume.

6. The storage apparatus according to claim 4, wherein the controller copies the shared data from the main-volume to the sub-volumes in background processing.

7. The storage apparatus according to claim 5, wherein the controller sets, as the management information in the memory, identification information for identifying in which area in the main-volume the sub-volumes share data with the main-volume.

8. The storage apparatus according to claim 7, wherein the controller sets the identification information as a flag on a bitmap, reads the shared data from a logical address in the main-volume associated with the flag, and copies that shared data to a logical address in a one sub-volume in which that shared data is to be stored.

9. The storage apparatus according to claim 5, wherein, when deleting the asynchronous pair for one of the sub-volumes, the controller copies the shared data from the main-volume to the one sub-volume.

10. The storage apparatus according to claim 8, wherein the controller uses the bitmap to manage any of the shared data after the one sub-volume has been set as forming an asynchronous pair with the primary volume, and also, after the synchronous pair for the main-volume or the asynchronous pair for the one sub-volume has been deleted, the controller manages any write data written to the main-volume that is set as forming a synchronous pair with the primary volume, as difference data, using a difference bitmap prepared for the main-volume or the one sub-volume whose pairing has been deleted.

11. The storage apparatus according to claim 1, wherein, if the host computer write-accesses the primary volume before the copy of the shared data from the main-volume to the selected sub-volume has been completed, the controller writes the write data to the selected sub-volume after the copy of the shared data has been completed.

12. The storage apparatus according to claim 1, wherein, if the main-volume is write-accessed before the copy of the shared data from the main-volume to the selected sub-volume has been completed, the controller writes the write data for that write access to the main-volume after the copy of the shared data has been completed.

13. The storage apparatus according to claim 5, wherein, when deleting the pairing of one of the sub-volumes with the primary volume, the controller copies the shared data from the main-volume to that one sub-volume.

14. The storage apparatus according to claim 13, wherein, if the sub-volume is write-accessed before the copy of the shared data from the main-volume to the one sub-volume has been completed, the controller writes the write data for that write access to the one sub-volume after the copy of the shared data has been completed from the main-volume to the one sub-volume.

15. The storage apparatus according to claim 13, wherein, if the host computer write-accesses the primary volume before the copy of the shared data from the main-volume to the one sub-volume has been completed, the controller writes the write data for that write access to the main-volume after the copy of the shared data has been completed from the main-volume to the one sub-volume.

16. A storage control method using a storage apparatus that provides a host computer with storage volumes and controls write access from the host computer to the storage volumes, the method comprising:

under control of the storage apparatus, generating, as the storage volumes, a primary volume that the host computer accesses and a plurality of secondary volumes that functions as a replicated volume for the primary volume;

defining the plurality of secondary volumes as comprising a main-volume to which write data for write access from the host computer directed to the primary volume is written and a plurality of sub-volumes sub volume that is subordinate to the main-volume, the main-volume forming a synchronous pair with the primary volume and the sub-volumes each forming an asynchronous pair with the primary volume; and upon receipt of the write access from the host computer, writing the write data to the primary volume and the main-volume, and then writing the write data that has been written to the main-volume to the plurality of sub-volumes later in background processing, wherein when the synchronous pair between the primary volume and the main-volume is split state, selecting one of the sub-volumes and changing the asynchronous pair between the primary volume and the selected sub-volume to a synchronous pair, so as to write, upon receipt of the write access from the host computer, the write data to the primary volume and the selected sub-volume, and then write the write data written to the selected sub-volume to the plurality of sub-volumes other than the selected sub-volume later in the background processing.

* * * * *